United States Patent Office 3,401,002
Patented Sept. 10, 1968

3,401,002
DYEING PREPARATIONS FOR THE MANUFACTURE OF WATER-INSOLUBLE AZO DYESTUFFS ON TEXTILE MATERIAL OF AROMATIC POLYESTERS OR TRIACETYLCELLULOSE
Helmut Arm, Langen, Hesse, and Rudolf Löwenfeld, Buchschlag, near Sprendlingen, Germany, assignors to Farbwerke Hoechst Aktiengesellschaft vormals Meister Lucius & Bruning, Frankfurt am Main, Germany, a corporation of Germany
No Drawing. Filed June 8, 1965, Ser. No. 462,416
Claims priority, application Germany, June 16, 1964, F 43,183
2 Claims. (Cl. 8—46)

ABSTRACT OF THE DISCLOSURE

Dyeing compositions consisting of (a) about 10–30% by weight of an arylamide of the 2,3-hydroxynaphthoic acid, (b) about 10–30% of a 4-aminoazo-naphthalene, (a) and (b) being present in equimolar amounts, (c) about 10–20% by weight of a water soluble condensation product of an aromatic hydroxy-compound e.g. 4,4'-dihydroxydiphenylmethane, and a 1-ω-sulfomethyl-2-hydroxynaphthalene-sulfonic acid, and (d) water for the use in dyeing aromatic polyester and triacetyl cellulose textile materials.

It is known to dye textile material of aromatic polyesters or triacetyl cellulose with developing dyestuffs by treating the material at elevated temperatures in dyebaths containing an azo component and a primary aromatic amine as well as, if desired, a so-called carrier. Subsequently, the dyestuff is formed by diazotization and coupling. For the preparation of the dyebaths there are generally used pulverulent dyeing preparations containing the azo component and the primary aromatic amine as well as suitable adjusting agents. Dyeing preparations containing an arylamide of the 2,3-hydroxynaphthoic acid and a 4-aminoazo-naphthalene have particular importance for dyeing. But the pulverulent dyeing preparations used until now have several disadvantages. Such preparations must first be dissolved with organic solvents. The solutions thus obtained can be added to the dyebaths only in portions, especially when used at a small ratio of goods to liquor, since, otherwise, precipitates may be formed. Besides, the said pulverulent dyeing preparations tend to dusting and, therefore, are difficult to be introduced to practice.

It has now been found that these disadvantages in the preparation of water-insoluble azo dyestuffs on textile material of aromatic polyesters or triacetyl cellulose are avoided by using dyeing preparations containing (a) an arylamide of the 2,3-hydroxynaphthoic acid,
(b) a 4-aminoazo-naphthalene,
(c) a water-soluble condensation product of an aromatic hydroxy-compound and of an aromatic ω-methanesulfonic acid and
(d) water.

The dyeing preparations of the present invention are doughs or pastes consisting of about 10 to 30% by weight of an arylamide of the 2,3-hydroxynaphthoic acid and about 10 to 30% of a 4-aminoazo-naphthalene in nearly equimolar amounts as well as of about 10 to 20 percent by weight of a water-soluble condensation product of an aromatic hydroxy-compound and an aromatic ω-methanesulfonic acid and of water.

Such dyeing preparations have a very good stability in storage and can be dispersed very finely by simply stirring in without using organic solvents in alkaline baths. The dispersions thus obtained have a very good stability so that the starting dyestuff may be added to the dyebath in a single portion, even when used at a small ratio of goods to liquor, and feeding which is necessary when using pulverulent dyeing preparations is no longer needed. As a result of their form as doughs or pastes, the new dyeing preparations can be handled far better than the known dyeing preparations.

The dyeing preparations of the present invention contain an arylamide of the 2,3-hydroxynaphthoic acid, which is free of sulfonic acid groups or carboxylic acid groups and is used in the ice colour technique, for example, 1 - (2',3' - hydroxynaphthoylamino) - 2 - methylbenzene, 1 - (2',3' - hydroxynaphthoylamino) - 2 - methoxybenzene, 1 - (2',3' - hydroxynaphthoylamino) - 2,5 - dimethoxy - benzene, 1 - (2',3' - hydroxynaphthoylamino) - 2-methyl - 4 - methoxybenzene, 1 - (2',3' - hydroxynaphthoylamino) - 2 - methoxy - 5 - chlorobenzene, or 1-(2',3' - hydroxynaphthoylamino) - 2 - methyl - 4 - chlorobenzene, as well as a 4-aminoazo-naphthalene free of sulfonic acid groups or of carboxylic acid groups, for example, 4-amino-1,1'-azonaphthalene, 4-amino-1,2'-azonaphthalene, 4 - amino - 4' - dimethylamino - 1,1' - azonaphthalene or 4-amino-4'-methoxy-6'-nitro-1,1'-azonaphthalene.

Furthermore, the said preparations contain a water-soluble condensation product of an aromatic hydroxy-compound and an aromatic ω-methanesulfonic acid, preferably a condensation product of a 4,4'-dihydroxydiphenylmethane and a 1-ω-sulfomethyl-2-hydroxynaphthalene-sulfonic acid, such as obtained, for example, according to the process of German Patent No. 426,424, as well as water.

The present dyeing preparations are suitably produced by grinding or kneading the 4-aminoazo-naphthalene with the condensation product of the aromatic hydroxy-compound and of the aromatic ω-methanesulfonic acid in the presence of water and, subsequently, by adding the arylamide of the 2,3-hydroxynaphthoic acid. The substance is then stirred until a homogeneous dough has formed.

The dyeing preparations for dyeing textile material of aromatic polyesters or triacetyl cellulose are used by diluting them with water and introducing them into a dyebath of 85 to 95° C. containing alkali and, if desired, a carrier. Subsequently, the dyeing proceeds in the known manner by impregnating, diazotizing and aftertreating in the presence of an acid donator, for example, tartaric acid diethylester or monochloro-acetic acid sodium or by simultaneously adding acetic acid.

The following examples serve to illustrate the invention, but they are not intended to limit it thereto; the parts being by weight unless otherwise stated:

Example 1

A mixture of 20 parts of 4-amino-1,1'-azonaphthalene, 10 parts of a condensation product of 4,4'-dihydroxy-3,3'-dimethyl - diphenylmethane and 1 - ω - sulfomethyl - 2-hydroxynaphthalene-6-sulfonic acid and of 50 parts by volume of water is ground in a ball mill until the particle size of the 4-amino-1,1'-azonaphthalene amounts to 0.5 to 2μ. Then a pulverulent 1-(2',3'-hydroxynaphthoylamino)-2-methoxybenzene (20 parts) is added and the mixture is stirred in order to obtain a homogeneous dough. By adding 0.5 part of a starchy ether the viscosity of the dough can be increased.

Example 2

A mixture of 20 parts of 4-amino-1,1'-azonaphthalene, 10 parts of a condensation product of 4,4'-dihydroxy-3,3'-dimethyl-diphenylmethane and of 1-ω-sulfomethyl-2-hydroxynaphthalene-6-sulfonic acid and of 8 parts by volume of water is kneaded in a Werner and Pfleiderer kneading device for about 2 hours and, subsequently, it is slowly diluted with 42 parts by volume of water in order to obtain a homogeneous dough. Then a pulverulent 1 - (2',3' - hydroxynaphthoylamino)-2-methyl-benzene (20 parts) is added and mixed by stirring. By adding 0.5 part of a starchy ether the viscosity of the dough can be increased.

In a similar manner there can be obtained dyeing preparations composed of (1) 20 parts of 2,3-hydroxynaphthoylamino-benzene, 20 parts of 4-amino-1,2'-azonaphthalene, 10 parts of a condensation product of 4,4'-dihydroxy-diphenylmethane and 1 - ω - sulfomethyl - 2 - hydroxynaphthalene - 6 - sulfonic acid and of 50 parts of water, or (2) 20 parts of 1-(2',3'-hydroxynaphthoylamino)-2-methyl-4-chlorobenzene, 20 parts of 4-amino-4'-dimethyl-amino-1,1'-azonaphthalene, 10 parts of a condensation product of 4,4'-dihydroxy-3,3'-dimethyl-diphenyl-methane and 1 - ω - sulfomethyl - 2 - hydroxynaphthalene - 6 - sulfonic acid and of 50 parts of water, or (3) 20 parts of 1-(2',3'-hydroxynaphtholylamino)-2,5-dimethoxybenzene, 20 parts of 4-amino-4'-methoxy-6'-nitro-1,1'-azonaphthalene, 10 parts of a condensation product of 4,4'-dihydroxydiphenylmethane and 1-ω-sulfomethyl-2-hydroxynaphthalene-6-sulfonic acid and of 50 parts of water, or (4) 20 parts of 1 - (2',3' - hydroxynaphthoylamino)-2-methyl-4-methoxybenzene, 20 parts of 4-amino-1,1'-azonaphthalene, 10 parts of a condensation product of 4,4'-dihydroxydiphenylmethane and 1 - ω - sulfomethyl - 2 - hydroxynaphthalene-6-sulfonic acid and of 50 parts of water.

We claim:

1. A dyeing composition for the manufacture of water-insoluble azo-dyestuffs on a textile material of an aromatic polyester or of triacetyl cellulose which comprises (a) about 10 to 30 percent by weight of an arylamide of 2,3-hydroxynaphthoic acid, (b) about 10 to 30 percent by weight of a 4-aminoazonaphthalene, said two components (a) and (b) being present in an about equimolar proportion, (c) about 10 to 20 percent by weight of a water-soluble condensation product of a 4,4'-dihydroxy-diphenylmethane and a 1-ω-sulfomethyl-2-hydroxynaphthalene-sulfonic acid, and (d) water.

2. A dyeing composition for the manufacture of water-insoluble azo-dyestuffs on a textile material of an aromatic polyester or of triacetyl cellulose which comprises (a) about 10 to 30 percent by weight of an arylamide of the formula

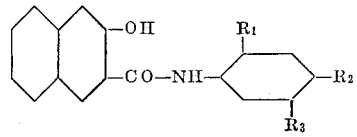

wherein $R_1$ represents hydrogen, lower alkyl or lower alkoxy, $R_2$ represents hydrogen, lower alkoxy or halogen, and $R_3$ represents hydrogen or lower alkoxy, (b) about 10 to 30 percent by weight of an azonaphthalene of the formula

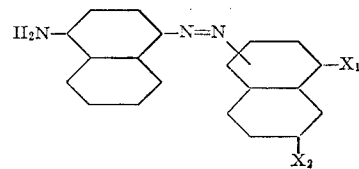

wherein $X_1$ represents hydrogen, lower alkoxy or di-(lower alkyl) amino, and $X_2$ represents hydrogen or nitro, said two components (a) and (b) being present in an about equimolar proportion, (c) about 10 to 20 percent by weight of a water-soluble condensation product of a dihydroxydiphenylmethane of the formula

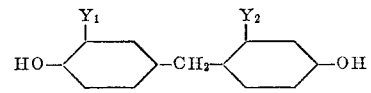

wherein $Y_1$ and $Y_2$ represent hydrogen or lower alkyl, and a naphthalene derivative of the formula

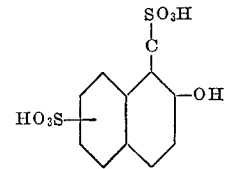

and (d) water.

References Cited
UNITED STATES PATENTS 3,081,141 3/1963 Harmuth _____ 8—45
3,101,235 8/1963 Orthner et al. _____ 8—44

NORMAN G. TORCHIN, *Primary Examiner.*

T. J. HERBERT, *Assistant Examiner.*